May 8, 1928.
J. A. MURPHEY
AUTOMOBILE LOCK
Filed May 5, 1927
1,669,205
2 Sheets-Sheet 1
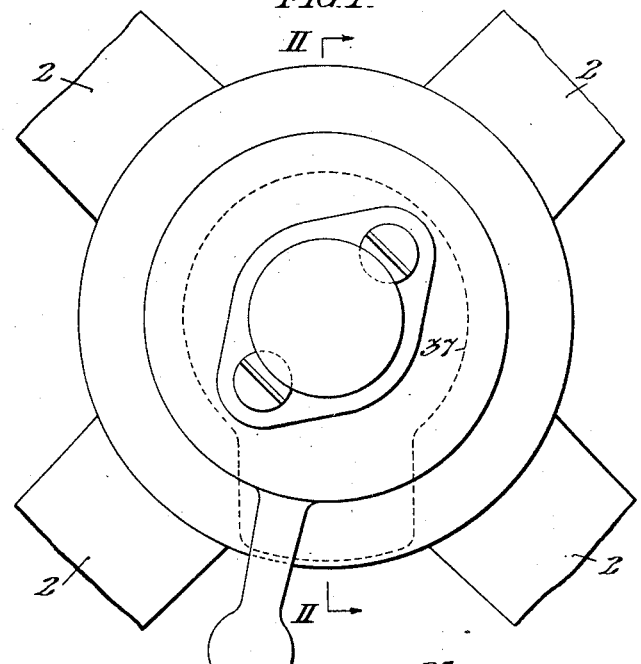
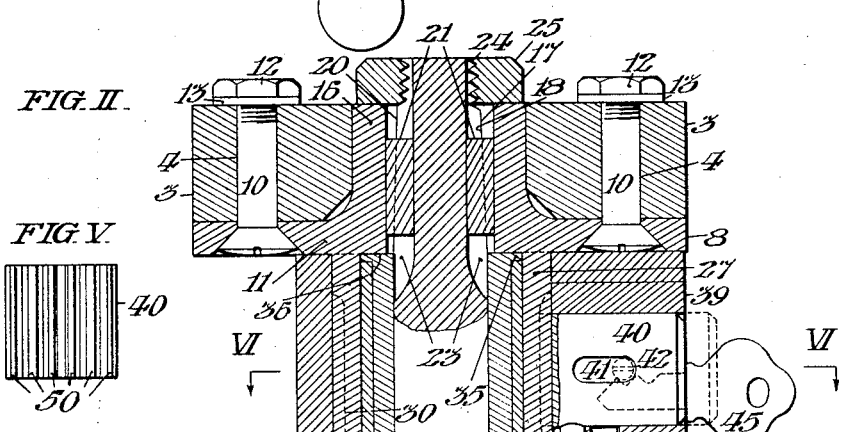
INVENTOR:
JAMES A. MURPHEY, May 8, 1928. 1,669,205
J. A. MURPHEY
AUTOMOBILE LOCK
Filed May 5, 1927 2 Sheets-Sheet 2
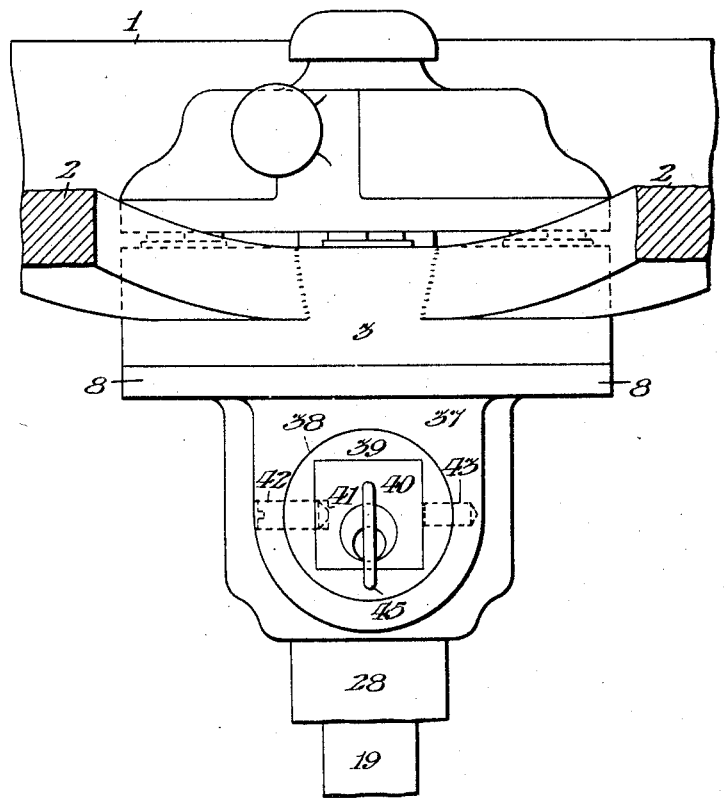
FIG. III.
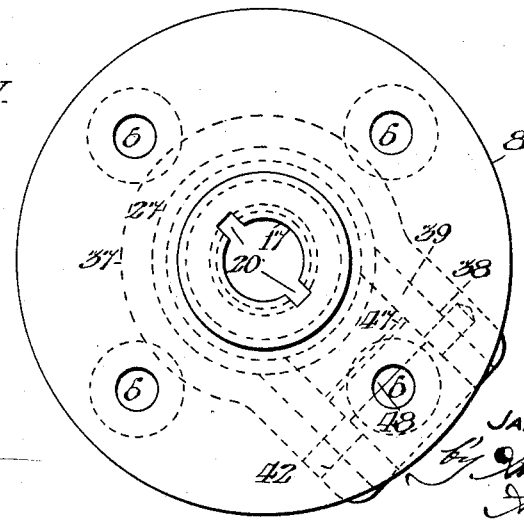
FIG. IV.
INVENTOR:
JAMES A. MURPHEY, Patented May 8, 1928.

1,669,205

UNITED STATES PATENT OFFICE.

JAMES A. MURPHEY, OF GERMANTOWN, PENNSYLVANIA.

AUTOMOBILE LOCK.

Application filed May 5, 1927. Serial No. 188,990.

This invention relates to mechanism of the general type described and claimed in Letters Patent of the United States No. 1,425,408 granted to me August 8, 1922; including locking means for detachably rigidly connecting the steering shaft of a self-propelled vehicle with the stationary bearing tubular column inclosing such shaft, so as to prevent the vehicle from being steered when locked; such locking means being mounted in a stationary casing which is rigidly connected with said bearing column. The specific form of my invention shown in said Letters Patent is adapted solely for connection with automobiles of the "Ford" type, including a planetary steering gear case at the top of the stationary bearing tube inclosing the steering shaft, and the locking means includes a radially reciprocatory cylindrical lock body, so constructed and arranged that it was necessary to provide the steering shaft with a sleeve having recesses of the full diameter of the lock body. That locking mechanism is entirely independent of the steering wheel; so that the ordinary "Ford" wheel may be readily applied to and removed therefrom, regardless of whether the locking mechanism is in locked position or not.

The object and effect of my present invention is to make an accessory which is adapted for connection with automobiles wherein the stationary steering column is a straight cylindrical tube, without any gear casing at the top thereof, and to avoid the expense of constructing and fitting such a sleeve by providing a steering wheel with a hub having a circular series of gear teeth formed upon the exterior thereof with spaces between such teeth, terminating above the lower end of said hub, and providing a radially reciprocatory lock body with an arcuate series of gear teeth formed upon the inner end thereof, adapted to engage the teeth in said hub when in locked position. That is to say, in my present invention, the steering wheel is of a special form and becomes a part of the locking mechanism; whereby both relative axial and revolutionary movement of said hub and steering shaft and stationary bearing column are prevented when said lock is in locked position.

In the respects last above noted, my present invention is similar to that claimed in my copending application Serial No. 79,546 filed January 6, 1926 for Letters Patent of the United States for improvement in automobile locks. However in that form of my invention, the lock body is cylindrical, whereas, in the present form of my invention, the lock body is rectangular and preferably square in cross section, and with the gear teeth formed parallel with opposite sides of said body, so as to afford a greater extent of the lock teeth for engagement with the hub teeth than can be afforded by the cylindrical lock body such as shown in my application Serial No. 79,546.

As hereinafter described; a lock body which is square in cross section, is mounted in a sleeve having an internal bore fitted thereto but having its circumference cylindrical, and said sleeve is fitted in a corresponding cylindrical recess in the lock casing which is rigidly connected with said bearing column, and said lock sleeve is held in said casing by means including a screw which extends through the side wall of said casing and said sleeve, into a longitudinal slot in the side of the lock body, to limit the reciprocatory movement of the latter.

My invention includes the various novel features of construction and arrangement hereinafter more definitely specified.

In the drawings; Fig. I is a fragmentary plan view of a steering wheel and its appurtenances, of the present type used in "Franklin" automobiles, but includes a convenient embodiment of my invention, wherein the lock casing is in unitary relation with a cap fixed upon the top of the stationary straight cylindrical tubular steering column with which such cars are equipped.

Fig. II is a fragmentary vertical sectional view of such structure, taken on the line II, II in Fig. I.

Fig. III is a fragmentary elevation of said structure.

Fig. IV is a plan view of the unitary wheel hub and lock casing.

Fig. V is an elevation of the toothed inner end of said lock body.

Fig. VI is a fragmentary plan sectional view of the wheel hub and radially reciprocatory lock body engaged therewith, taken on the line VI, VI in Fig. II.

In said figures; the steering wheel comprises the rim 1, spokes 2 and hub ring 3, conveniently formed entirely of wood. Said hub ring has a series of four bolt openings 4 therethrough respectively in registry with the bolt openings 6 in the metallic hub 8.

As shown in Fig. II, said openings 4 and 6 are adapted to receive bolts 10 having heads countersunk in the flange 11 of said metallic hub 8, and having nuts 12 and spring washers 13 above said hub ring 3.

It is to be understood that said steering wheel is rigidly connected with its metallic hub 8 by the means above described. Said hub has the upper axial boss 16 with the conical bore 17 fitted to the upper conical end 18 of the steering shaft 19, and with diametrically opposite keyways 20 for the keys 21 which extend into the keyways 23 in said shaft, as shown in Fig. II. The upper end of said shaft 19 has the screw thread 24 for engagement with the nut 25; whereby said shaft 19 is rigidly connected with said steering wheel.

Said hub 8 has the tubular skirt flange 27 overhanging the stationary bearing column 28, in coaxial, spaced, relation with said shaft 19. Said hub flange 27 has the circular series of gear teeth 29 formed upon the exterior thereof, with spaces 30 between such teeth; said spaces terminating above the lower end of said hub; thus leaving a retaining ledge 31 at the lower end of said hub 8, to prevent removal of the wheel when locked.

As shown in Fig. II; said steering shaft 19 is journaled in the bearing bushing 33 in said stationary column 28. Said bushing has the flange 35 at the top thereof overlying the end of said column and abutting against the shoulder 36 in the lock casing cap 37 which is secured to said column by being soldered, brazed, electrically welded, or otherwise rigidly connected therewith.

The casing 37 has the lock socket 38, extending radially with respect to said shaft 19, as indicated in Fig. IV, and conveniently presented directly in front of the operator and containing the sleeve 39 which is cylindrical upon its outer perimeter but has a rectangular opening therethrough to fit the lock body 40 which is mounted to reciprocate radially therein, with respect to said shaft 19. Said sleeve is adapted to be formed by a die casting operation at less cost than the machined steel parts of the other forms of my invention aforesaid, for which it is substituted. The reciprocatory movement of the lock body 40 in said sleeve is limited by the slot 41 in said body in which extends the screw 42 which is in threaded engagement with the side wall of said lock casing, as indicated in dotted lines in Fig. III, and extends through said sleeve 39; serving to retain the latter in the casing. However, I prefer to also secure said sleeve in the casing by the pin 43 which extends through the opposite wall of said sleeve, in axial alinement with said screw 42, and into the side will of the casing 37.

Said lock 40 is conveniently of the pin tumbler type and includes the locking plunger 44 which is adapted to be retracted and projected by turning movement of the key 45 so as to alternately engage the locking recesses 47 and 48 in said sleeve 39; to alternately detain said lock body 40 in the locked position shown in Fig. II in full lines and in the unlocked position indicated in that figure in dotted lines.

As best shown in Fig. VI; said lock body 40 has an arcuate series of teeth 50 formed thereon at its inner end for engagement in the toothed recesses 30 in said wheel hub 8. As indicated in Fig. II; said tooth recesses 30 are adapted to be formed by a milling cutter rotating upon an axis at right angles to the axis of said hub 8, and are so shaped that when the lock 40 is in the locked position shown in Fig. II; said hub 8 cannot be withdrawn therefrom, even if said nut 25 be removed from the steering shaft 19. Consequently, in said locked position of the device, it is impossible to remove said lock casing 37 from said column 28; and it is impossible to remove said sleeve from said lock casing. However, when said screw 42 is withdrawn, it is possible to unlock and withdraw the lock body 40 and to then remove the pin 43 so as to permit withdrawal of the sleeve 39 from the casing 37. Said pin 43 may be a screw.

It is to be understood that, during the normal operation of the vehicle, said steering wheel and its shaft 19 may be freely turned by the operator; the hub 8 resting upon the top of the bearing bushing 33 and said lock 40 being in the unlocked position indicated in Fig. II. However, when it is desired to prevent the vehicle from being steered; said steering wheel and shaft may be locked in any desired position of rotation, by thrusting said lock 40 into the inner locked position shown in full lines in Figs. II and VI. Said teeth 29 are so small, in circumferential extent, that such locking may not only be effected with the front wheels of the vehicle in any desired position; for instance, with said wheels turned toward a street curb, upon either side of the vehicle, but may be effected much more conveniently than in the form of my invention shown in said Letters Patent.

It is to be particularly noted that both relative axial and revolutionary movement of said hub and steering shaft and column are prevented, when said lock 40 is in the locked position shown in full lines in Fig. II; thus not only locking the steering mechanism so that the automobile cannot be operated, but preventing theft of the steering wheel.

The form of my invention above described may be substituted for the stock wheel furnished with the automobile contemplated, without any change in the construction of the latter, except to provide the upper end of the stationary steering column 28 with the casing cap 37. That is to say, the form of my invention above described may be sold and applied as an accessory to an ordinary stock car, or may be primarily included therein.

Athough I have shown my invention embodied as applied to a specific form of steering wheel adapted for wooden construction; it is to be understood that any suitable form of steering wheel may be employed; if it is provided with a hub with suitable locking recesses for engagement with the teeth at the inner end of the lock body.

Therefore, I do desire to limit myself to the precise details of construction and arrangement herein set forth, as it is obvious that various modifications may be made therein without departing from the essential features of my invention, as defined in the appended claims.

I claim:

1. A lock body, rectangular in cross section, and having a series of corrugations in one end thereof parallel with two opposite sides thereof; adapted to engage the article to be locked.

2. A lock body, rectangular in cross section, and having a series of corrugations in one end thereof parallel with two opposite sides thereof; adapted to engage the article to be locked; and a sleeve fitted to said body and having a cylindrical perimeter.

3. A lock body, rectangular in cross section, and having a series of corrugations in one end thereof parallel with two opposite sides thereof; adapted to engage the article to be locked; and casing means including a rectangular lock socket arranged to hold said body with said corrugations parallel with the axis of, and in cooperative relation with an automobile steering gear, and prevent said body from turning; whereby said gear may be locked and prevented from rotating.

4. An article of manufacture, appurtenant to automobile locking mechanism, consisting of a metal sleeve of outer cylindrical configuration, having a lock socket of rectangular configuration extending therethrough in coaxial relation therewith and having a plurality of internal recesses in axially spaced relation adapted for engagement with a lock plunger.

5. An article of manufacture, as in claim 9, having holes in coaxial relation in opposite side walls thereof; one of said holes being larger than the other and the smaller hole being screw threaded.

In testimony whereof, I have hereunto signed my name at Philadelphia, Pennsylvania, this second day of May, 1927.

JAMES A. MURPHEY.

CERTIFICATE OF CORRECTION.

Patent No. 1,669,205.  Granted May 8, 1928, to

JAMES A. MURPHEY.

It is hereby certified that error appears in the printed specification of the above numbered patent requiring correction as follows: Page 1, line 58, after the word "However" insert a comma; page 3, line 16, after the word "do" insert the word "not"; and that the said Letters Patent should be read with these corrections therein that the same may conform to the record of the case in the Patent Office.

Signed and sealed this 29th day of May, A. D. 1928.

(Seal)

M. J. Moore,
Acting Commissioner of Patents.